United States Patent Office 3,259,567
Patented July 5, 1966

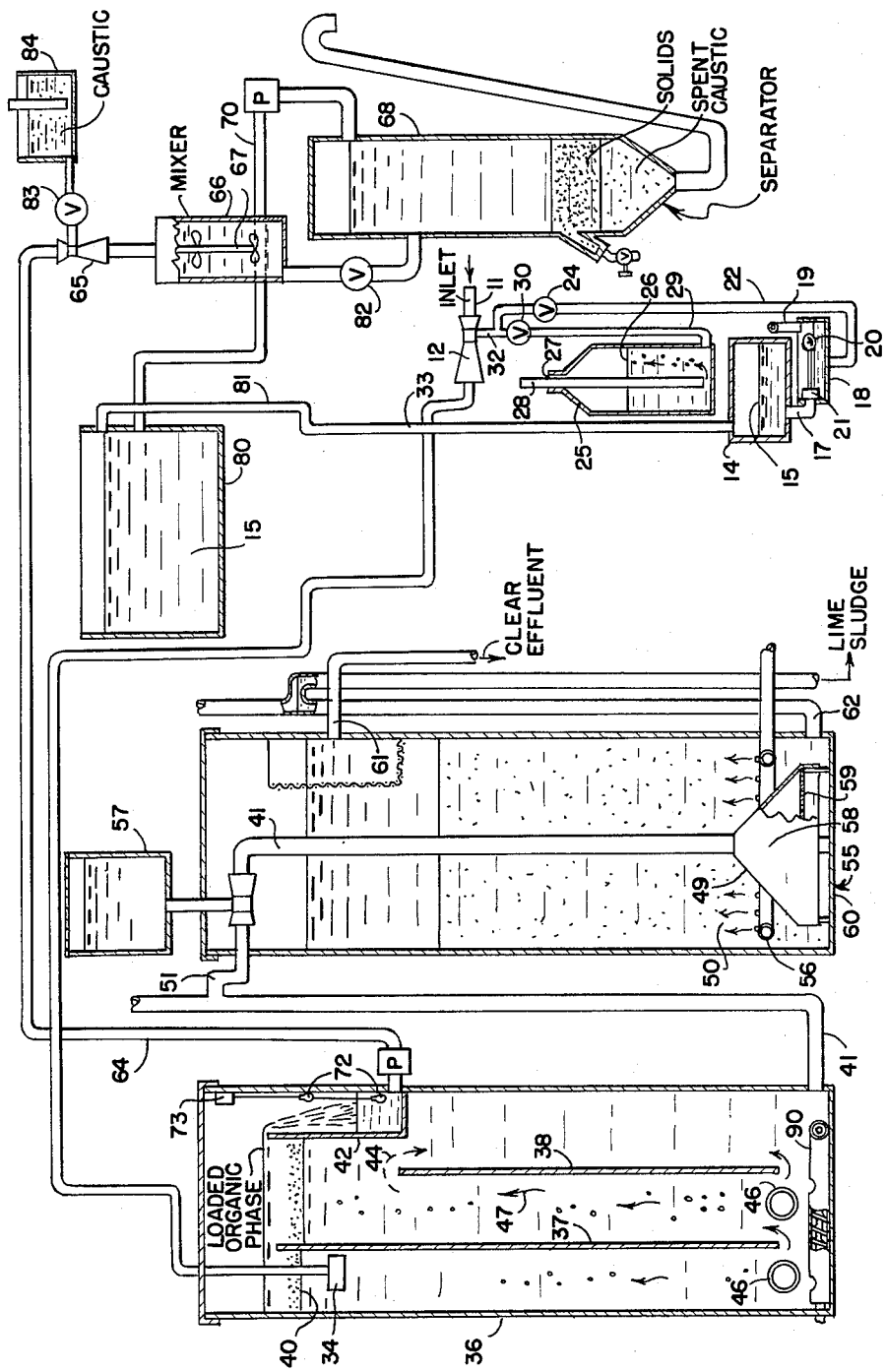
FIG. I

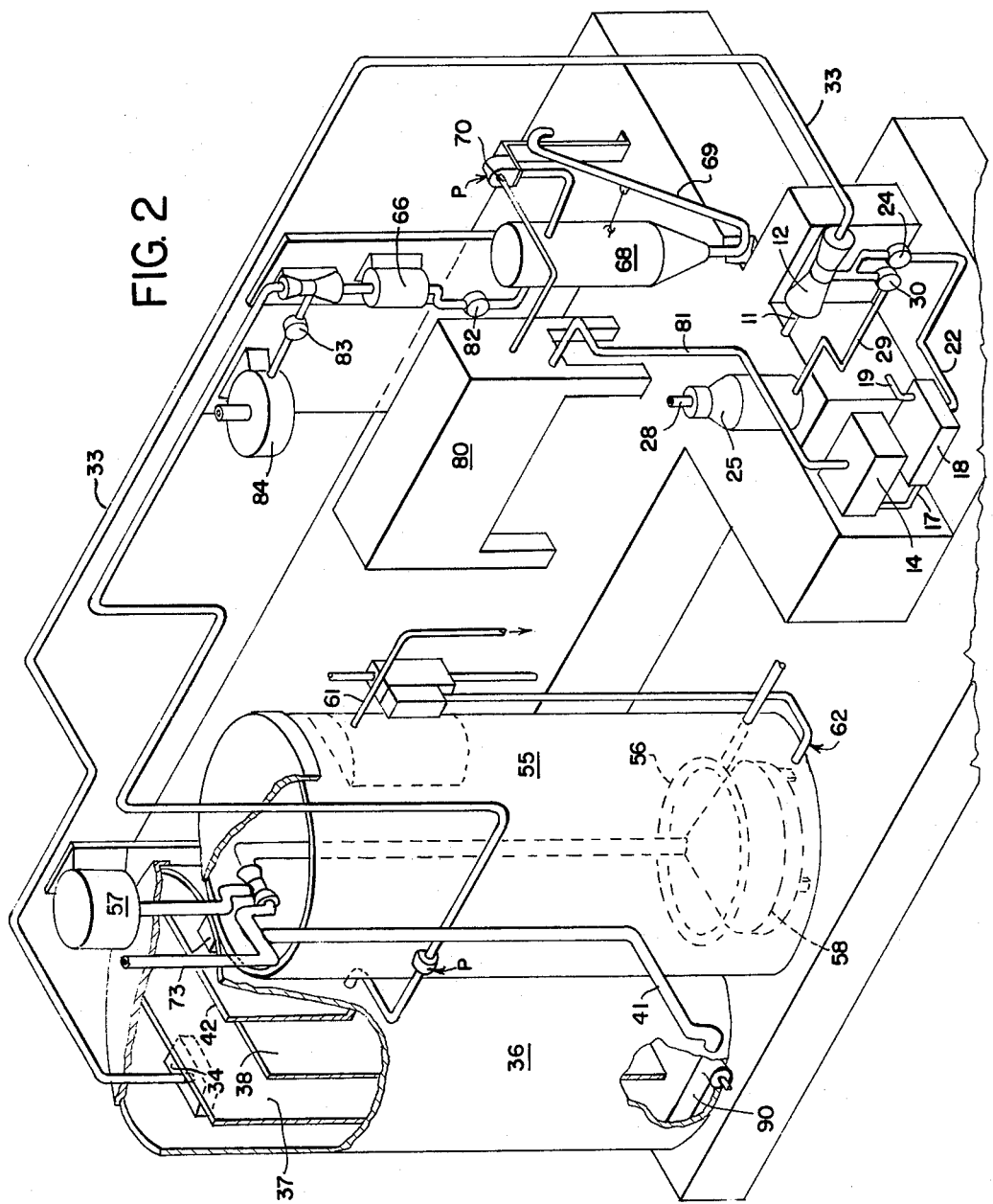

3,259,567
METHOD AND APPARATUS FOR TREATMENT
OF DETERGENT-LADEN WASTES
Herbert N. Dunning, St. Paul, and James S. Gulenchyn,
Minneapolis, Minn., assignors to General Mills, Inc.,
a corporation of Delaware
Filed Jan. 31, 1964, Ser. No. 341,630
14 Claims. (Cl. 210—21)

The present invention relates generally to an apparatus and technique for treating domestic and industrial wastes, and more particularly to an apparatus and technique for removing detergents, phosphates, and other impurities from aqueous solutions.

Certain of the desirable qualities of detergents, along with alkali metal phosphates and polyphosphates, including their cleaning efficiency, their chemical stability, and their antiseptic qualities have led to general use of these materials as cleansers for both household and commercial purposes. Unfortunately, it is these outstanding qualities of detergents and phosphates which have created a sewage disposal problem since the chemical stability of the materials and the antiseptic qualities of the detergents render it extremely difficult to treat the sewage systems by the normal accepted methods. Unfortunately, the properties which are desired in a cleaner or detergent are generally those properties which are undesired in the effluent or discharge which is introduced into the effective sewage disposal or processing systems. Since the detergent materials have outstanding stability, unless they are treated in order to separate them from the effluent which is passed through these sewage disposal systems, the detergent-laden treated sewage may then be discharged into rivers or streams, or introduced into underground water supplies where a potential health hazard exists to humans, domestic animals, livestock and wildlife.

Because of the nature of the problem, efforts have been made to design effective apparatus and techniques for separating detergents, phosphates and BOD (Biochemical Oxygen Demand materials) from the effluent. The techniques have normally involved three major steps, these being: (1) extraction, (2) sedimentation or flotation, and (3) flocculation or precipitation. In the extraction operation, a compound is introduced into the waste which separates at least a portion of the detergent and other organic material from the detergent-laden solution. In the sedimentation or flotation operation, certain additional quantities of detergent are separated from the detergent-laden material, and caused to float on top of the sedimentation tank or removed by other physical separation techniques. In the flocculation operation, a second impurity introduced by the soaps or cleaning compositions is removed, this being the phosphate salt such as trisodium phosphate or polyphosphates which are normally found in detergent-laden waste solutions. The flocculation is accomplished by means of addition of a compound containing a cationic element, the phosphate of which is insoluble, and the precipitate or sludge that is formed, normally called "lime-sludge," is then separated from the partially treated detergent-laden waste material and a clear effluent is simultaneously removed therefrom.

In accordance with the present invention, it has been found that the sedimentation or flotation operation may be combined with the flocculation or precipitation operation and thus simplify the equipment which is otherwise necessary in order to effectively treat the detergent-laden waste solution. It has been found that the oils and solids which previously had been removed in the sedimentation operation may now, in accordance with the present invention, be retained with the lime-sludge and removed with this sludge. This technique avoids the difficult separation step which was normally encountered in the sedimentation operation; thus the most difficult step in the operation is effectively eliminated. The apparatus necessary for carrying out the technique of the present invention is highly effective, more easily operated, less expensive, and requires less space for installation and maintenance.

Therefore, it is an object of the present invention to provide an improved means for treating detergent-laden waste solutions, and to provide for economic and expeditious removal of detergents and other materials from these aqueous solutions.

It is a further object of the present invention to provide an improved means for treating detergent-laden waste solutions by two major operations, the first being an extraction technique wherein the anionic portion of the detergent and other organic materials are removed, the second being a flocculation or precipitation technique wherein the phosphate salts are removed from the waste material.

It is yet a further object of the present invention to provide an improved apparatus and technique for effectively and economically separating the oil soluble portions of the detergent and waste along with the phosphate salts normally present therein, from the remaining portions of the aqueous waste solutions.

Other and further objects of the present invention will become apparent to those skilled in the art upon a study of the following specification, appended claims, and accompanying drawings, wherein:

FIGURE 1 is a schematic diagram illustrating the treating chambers along with peripheral equipment utilized in connection with the treatment of an aqueous solution or waste material for removing detergents and phosphates therefrom; and FIGURE 2 is a perspective view of the apparatus and associated equipment illustrated in FIGURE 1.

Reference is made to FIGURE 1 of the drawings which illustrates a schematic flow diagram of an apparatus which may be utilized to carry out the technique of the present invention. It will be appreciated that the process may be carried out in other apparatus, however, the apparatus shown in FIGURES 1 and 2 is well adapted for carrying out the various operations of the present invention. An aqueous solution containing an anionic detergent such as, for example, sodium benzene sulfonate along with a quantity of a soluble phosphate, for example, tri-sodium phosphate, these materials being common to essentially all of the detergents and cleaners in use today, and common waste materials are introduced into the inlet 11 of the apparatus. This aqueous solution containing the detergent material along with the phosphate salt may be the effluent which is obtained from a domestic installation, or from a commercial installation such as a self-service laundry or the like, or any other installation wherein various detergents are being utilized for cleansing purposes. The aqueous detergent-containing solution is pumped by a pumping system, not shown, into the injection mixer 12 where a treating fluid is added thereto. While various types of injection mixers may be utilized, a venturi mixer or any other type of metering mechanism may be utilized in order to provide the proper ratio of treating fluid to effluent or waste solution. An example of the injection mixer 12 is illustrated on page 1203 of the Chemical Engineer's Handbook, third edition, published by McGraw-Hill Book Company, Inc., this being a device which is readily commercially available. The venturi type injection mixer has been found to be preferable inasmuch as the input from the source may be intermittent, hence uniform mixing ratios are available regardless of the instantaneous flow rate at the input. The treating material which is to be added to the waste solution containing the detergent is a water immiscible liquid containing an amine compound. The water immiscible liquid may be any of a variety of materials such as a vegetable oils, or moderately high boiling hydrocarbons such as kerosene, fuel oil, or the like. The amine utilized is soluble in the organic solvent, however it is preferably immiscible with water. Primary, secondary or tertiary amines may be utilized. However in order to obtain an amine which is immiscible with water, a sufficient number of carbon atoms should be present in the organic portion of the composition. Examples of amines which have been found suitable in this regard are trioctyl amine, dioleyl amine (with one unsaturated linkage present), di-tallow amine, or the like. The treating fluid contains, for example, 4% of the amine, balance solvent, although from 0.1% to 40% of amine may be used.

The treating fluid is maintained in a reservoir at 14, and is shown therein as at 15. The conduit 17 is in communication with the reservoir chamber 14, and feeds the treating fluid 15 to a float chamber or the like 18. Float chamber 18 is vented to the atmosphere through a vent tube or the like 19, and thus since the fluid level within the chamber 18 is maintained substantially constant, the fluid head which is available to the injection mixer 12 will remain correspondingly constant. The float 20 is utilized to controllably actuate the float valve 21 in order that the fluid 15 may be controllably introduced to the chamber 18. Conduit 22 is utilized to communicate between the chamber 18 and the inlet to the injection mixer 12. Inasmuch as the input to the inlet 11 may be intermittent, a check valve 24 is disposed along the conduit 22 in order to prevent the return of treating fluid retained within the conduit 22 to the chamber 18, thus maintaining the predetermined ratio of treating fluid being supplied to the entering effluent or waste solution at a constant value.

It has been found that the extraction of the anionic detergent from the aqueous solutions is most efficiently accomplished when the mixture of the treating fluid and the aqueous solution being treated is maintained slightly acidic. Therefore, means are provided to supply a material to the mixture to render the resultant product at a proper pH level. A pH in the range of from about 3.0 to 7.0 is useful, with a range of from about 4.0 to 5.0 being preferred. Because of the economic advantages, an acid such as sulfuric acid is utilized to adjust the pH of the resultant mixture. This acid is maintained in the reservoir 25, the supply of acid therein being designated 26. The container is provided with a stopper or the like 27 which carries the vent tube 28. Thus, the pressure head which the injection nozzle or mixer experiences relative to the sulfuric acid 26 will remain substantially constant during removal of the acid from the container 25. The conduit 29 communicates between the bottom portion of the container 25 and the inlet to injection mixer 12, a check valve such as the check valve 30 being utilized to maintain the fluid in the conduit 29 at a substantially constant level regardless of the immediate status of the flow condition existing in the input 11. Because of the corrosive nature of the acid being utilized, the vent 28 should be of sufficient length to prevent any undesirable overflow condition from occurring. It will be appreciated, of course, that various other acids such as hydrochloric acid or nitric acid may be utilized to adjust the pH of the mixture, sulfuric acid being preferred primarily because of its low cost. Normally, the treating fluid is added after the acid has been added, this treating fluid material being less readily emulsified in an acid medium.

Fluid flow through the input 11, and through the reduced orifice chamber 12, produces a suction on the line 32, the magnitude of the suction being sufficient to inject or aspirate both treating solution and acid into the injection mixer 12. The relative quantities of the treating fluid and acid which moves through the lines 22 and 29 respectively is varied in accordance with the magnitude of the pressure drop which is experienced at line 32, the magnitude of this pressure drop being, of course, a function of the velocity of the flow of aqueous solution from the input line 11 through the injection mixer 12. With this type of a metering device, a constant mixture ratio can be maintained between various components including the aqueous solution or effluent being treated, the acid, and the treating fluid as the entire mixture leaves the injection mixer and enters the conduit 33. Of course, reduction orifices, valves or the like may be interposed along the lines 29 and 22 in order to control or regulate the relative quantities of these materials being added to the system through the injection mixer 12. Alternately, the oil and/or acid may be forced into the mixer by a positive displacement pump or external pressure source. For normal installations, it has been found that the pH of the effluent or mixture entering through the input 11 is relatively constant, and unless the operating conditions change substantially, a single or initial calibration may be utilized for continuous use of the equipment.

The mixture of aqueous solution, treating fluid, and acid is discharged from the injection mixer 12, moved through the conduit 33, delivered to a discharge unit or the like 34 and introduced into tank 36. The discharge unit 34 preferably distributes the incoming mixture or solution over a relatively wide area of the entry area of tank 34, hence, a spray or spreader device or the like is preferred. In has been found that distributing the incoming material through the spray head or the like 34 aids substantially in the thoroughly mixing of the mixture for the material being treated and the treating fluid per se. For convenience, a simple distribution box with a perforated bottom as illustrated in the drawings has been found to be satisfactory, however, a toroidal coil or a slotted pipe may also be utilized with the coil or pipe being immersed in the solution within the tank, if desired.

The treating tank 36 is preferably cylindrical in cross-section, and contains a baffle system which defines a tortuous path of flow for the mixture of material which is discharged from the unit 34 and subsequently moved through the chamber defined by the cylindrical tank 36. The baffle system includes a series of substantially vertically disposed plates which extend as chords from spaced points along the inner periphery of the tank 36, these plates being designated 37 and 38. It will be appreciated that a greater or lesser number of baffles may be utilized, however, for a cylindrical tank 34 inches in diameter and 6 feet tall, capable of treating 15 g.p.m., a pair of baffle plates has been found adequate in order to accomplish good results in accordance with the technique of the present invention. The material entering the tank will separate into two phases, an aqueous phase together with a loaded organic phase. The loaded organic phase includes the anionic or oil soluble portion of the detergents, or waste as well as the treating fluid which has been previously introduced into the solution. The aqueous portion of the mixture contains the phosphates and settles out from the loaded organic phase such as along atong the interfacial line 40 which defines a separation between the two phases. The top of baffle 37 terminates at a point located in the loaded organic phase, above the separation line 40; however, the lower edge does not extend all of the way to the bottom of the tank and is accordingly spaced therefrom. The lower edge of baffle plate 38 extends all the way to the bottom of the tank. However the top edge is disposed at a point vertically beneath the interface 40. The termination of the baffle 38 at a point below the interface permits the material in the aqueous phase to move continuously through the chamber and ultimately be discharged from the chamber 36 through the outlet 41 in the arrangement insuring that the fluid passing through the system has an adequate retention time therein. The arrows 44 indicate the path which the fluid follows as it moves through the treating chamber. The baffle 37 terminates at a point between the interface 40 and the top level of the loaded organic phase in order to permit this material to move continuously transversely across the diameter of the tank 36 and ultimately into the discharge receptacle or surge tank 42 from which tank further treatment is conducted as hereinafter described.

While the baffle system disclosed hereinabove is preferred for the operation, it will be appreciated that certain other arrangements may be employed as well. For example, a cylindrical tank may be employed with an annularly disposed coaxial baffle plate extending upwardly from the bottom to a point just below the interface between the organic phase and the aqueous phase. The mixture enters the inner chamber near the bottom, is aerated, and the phases are caused to separate therein. The aqueous phase overflows the cylindrical baffle plate, moves downwardly through the annular area, and is ultimately carried to the bottom of the tank where it is withdrawn, while the loaded organic phase may be withdrawn from the top portion of the separator chamber as previously indicated. It is also possible to utilize a separate tank for individual stages of separation of loaded or organic substance from the aqueous phase or extraction are carried out, however, the economic aspects of such an arrangement are not deemed favorable. Furthermore, if a tank having a sufficiently large cross-section is available, it is not necessary that baffles be employed at all. Of course, it will be further appreciated that the baffles are not necessarily vertically disposed, and accordingly these baffles may be arranged at various angles relative to the chamber in order to provide the required flow path therethrough.

The anionic detergent which is in the aqueous solution and which is to be separated therefrom, is a surface active material having the property of being readily collected at a gas-liquid interface such as is found on bubbles which move through a column or body of an aqueous solution. This surface active characteristic may be employed to an advantage in order to provide an efficient and effective tool for aiding in the separation of the anionic detergent and other surface active materials from the aqueous solution. In order to utilize this characteristic to advantage, a series of spargers or air dispensers 46—46 are disposed along the bottom surface of the tank 36, the spargers being arranged and designed to pass a gaseous fluid through the system along a path such as at 47—47. While air is the most economically employed gaseous fluid, other materials may be utilized as well, such as, for example nitrogen or the like. The introduction of air in the form of bubbles to the aqueous phase will provide the required surface for assisting in the separation of a loaded organic phase from the aqueous phase. If desired, the spargers may also be utilized to introduce the raw solution into the tank, as required. Furthermore, the spargers 46—46 may be available in the form of a toroidal member or the like which is perforated along the surface, this design enabling a discharge of the gaseous fluid into the various portions of the treating chamber, as required.

As the bubbles 47—47 rise toward the surface, and toward the organic phase, additional detergent and suspended solids collect along the surface thereof. These bubbles ultimately reach the interface between the two phases and the separation is accomplished as required at that point. Accordingly, any detergent which collects at the surface of the air bubbles is introduced or carried to the phase which includes the amine compound. The contact or combination will be effective in permanently separating the anionic detergent from the aqueous solution. In addition to transporting the detergent per se, the bubbles permit additional separation of entrained detergent-amine which may be present in the aqueous phase. The bubbles accordingly provide a mechanical conveyance for transferring the anionic detergent out of the aqueous phase of the solution. In order to obtain the maximum effect of the introduction of air or other gaseous fluid to the tank, the spargers are placed as close as is practical to the bottom of the treating tank.

The partially treated solution ultimately moves into the tank 55, and into the zone 50 thereof. The conduit 41 is in communication with both tanks, and includes a high point or weir area as at 51 in order to maintain the level of the material included in the tank 36 at an appropriate predetermined or constant level. The conduit 41 is, of course, vented in order to prevent siphoning from occurring in the line between the tanks.

Normally, material leaving the tank 36 would, according to techniques used in the past, be transferred to a sedimentation chamber in order to accomplish further separation of the organic phase from the liquid phase. However, in accordance with the present invention, the aqueous phase is transferred directly to a second treating chamber or the like 55 wherein lime, or an equivalent composition, is added to form a flocculent precipitate with phosphate or similar materials which are contained or retained in the aqueous phase. The precipitate which is formed, such as in the form of a sludge, is then removed. It has been found that additional quantities of the organic phase are carried out in the lime sludge. Removal is preferably accomplished by draining off the sludge as a slurry, or by removing it with an auger or other means. In some cases, the sludge may be floated to the top of the chamber by aeration and removed there. For best operation, it has been found that the use of a substantially quiescent chamber is preferred. However, a small quantity of air may be introduced therein, this quantity of air being extremely modest, a tank of 34 inch diameter, 6 feet in height, treating 15 g.p.m., requiring only between 0.1 and 0.2 c.f.m. This introduction of air assists in mild agitation in the separation operation.

The partially treated material from the first tank or chamber is introduced into the second chamber at a point adjacent the bottom thereof, and from there into an annular precipitation zone disposed between an upper discharge port and a lower discharge port. The precipitation zone is one which has a cross-section which increases in the upward direction, and hence the flow rate in this chamber diminishes as the column height increases. A mechanical sedimentation, separation, or the like may be achieved between settling sludge and the clarified liquid, the clarified liquid being removed from the top of the quiescent chamber, with the sludge being removed as a slurry from the lower outlet portion of the chamber.

In order to form the sludge to achieve the desired separation of the phosphates or similar materials, a compound is added which includes a water soluble chemical containing a cationic element, the phosphate of which is insoluble. In this connection, salts of the elements of Group IIa of the Periodic Table are preferred. Examples of compositions which may be used are the oxides or the hydroxides of calcium, barium, magnesium, or strontium. Certain rare earth oxides may also be used. These materials generally are divalent oxides, the divalent cationic element of which forms phosphate salts which are insoluble in water. In order to introduce the lime to the aqueous phase, a reservoir or retainer chamber 57 is provided which includes a slurry of calcium oxide. Of course, it will be appreciated that either a slurry or dry feeder may be utilized, and one convenient dry-feeding technique is to fabricate a stick of material having a certain predetermined diameter, such as, for example, a two inch diameter rod of calcium oxide. The rod may be formed by means of an excipient such as a vegetable colloid or guar, the excipient providing the required mechanical strength in the rod. Suitable means may be utilized to abrade away a certain portion of the rod in order to add the required quantity of lime to the mixture. If a slurry is prepared, it may be injected into the liquid phase by means of an injector nozzle similar to the injector nozzle 12. As the solution flows through the line 41, and as it approaches the bottom of the tank 55, the cross-sectional area of the conduit increases or flares outwardly in a conical manner as at 58. The cone 58 is supported along the bottom surface 60 of the tank 55, the discharge area being disposed in closely spaced relationship from that bottom surface. A diffuser screen or the like may be utilized in the discharge area of the cone element 58, such as is illustrated at 59. The closely spaced relationship of the discharge from the cone 58 and the bottom surface 60 of the tank 55 provides a sufficient amount of turbulence to maintain the flocculent precipitate in substantially suspended form. The clarified effluent water is removed through the upper discharge 61, while the lime sludge is simultaneously or intermittently removed from the tank along the lower outlet such as at 62. The relative ratios of material moving between the conduits 61 and 62 are typically dictated by the nature of the raw material being treated. However, for a normal operation, about 10% of the liquid is extracted from the lower outlets, while the remainder is removed as clarified liquid from the upper outlets. If the input to the system is intermittent, suitable means such as a side arm conduit should be provided to maintain the lime sludge in agitated fluid condition at all tmes.

Turning now to the recovery or regeneration of the treating fluids, particular attention is directed to the surge tank or reservoir 42 which contains the anionic materials in the organic phase which has been separated from the aqueous solution. This phase may be further treated in order to separate the anionic material from the treating fluid and solvent carrier therefor. This may be accomplished by mixing the loaded treating fluid or loaded organic phase material with caustic, a saline solution, or mixtures of caustic, such as sodium hydroxide and a salt such as, for example, sodium chloride.

A loaded organic material from the surge tank 42 moves through conduit 64 to a mixing valve 66. The chamber may be of various designs, such as, for example, an ordinary mixing chamber where mixing is accomplished by turbulence introduced by the agitator blades 67. The caustic solution from reservoir 84 may be introduced into the loaded oil by means of a venturi type mixer or the like such as at 65. After the loaded oil is mixed with a concentrated solution of sodium hydroxide in the ratio of about 95% loaded oil, balance sodium hydroxide, the mixture is passed into a separating chamber or the like 68 wherein the treating fluid may be separated from the spent caustic, detergent material, and any entrained solids. The level in tank 68 may be controlled by the conduit 69 such as in the form of a jackleg or weir element, the conduit 69 being in communication with the bottom discharge port of the separator tank 68. The regenerated or reconstituted treating fluid is passed through the outlet 70 which is disposed at the upper portion of the settling tank 68.

In order to monitor the ratio of loaded oil to caustic solution, an intermittent pump may be utilized from the surge tank 42 to transfer the loaded oil or organic phase to the mixing chamber 66. Thus, if desired, a control such as vertically spaced thermally or electrically responsive sensors, a simple float mechanism, or the like may be utilized to indicate a full or substantially full condition on the surge tank 42. A system is indicated as at 72, including a pair of vertically spaced thermally responsive sensors, and a pump energizing relay actuated therefrom, such as at 73. Thus, when the level of material in the surge chamber reaches the level of the upper sensor 72, the motor energizing relay is utilized to start the pumping motor, not shown, for transferring material from the surge tank 42 into the mixer chamber 66. Check valve 82 is utilized to prevent reverse flow of material from the tank 68, and a check valve 83 is utilized to assist in metering the caustic solution into the loaded oil.

The recycled or regenerated treating fluid is transferred from tank 68 to a tank 80, where it is stored or retained until needed. The tank 80 is in communication with the reservoir 14, and treating fluid which is maintained in the tank 80 may be transferred to the reservoir 14 as required. Suitable means may be utilized to prevent siphoning of the regenerated treating fluid from the tank 80, hence an overflow arrangement may be utilized, the overflowing treating fluid being passed along conduit 81 to the reservoir 14 as indicated. The sludge which collects in the spent caustic solution, along with the detergent and water, is drained off through the conduit 69. This assists in maintaining the reconstituted and regenerated treating fluid as clean as possible.

If the waste aqueous solution being treated contains any quantity of solid matter, which may otherwise tend to settle to the bottom of the treating tank 55, means may be provided to remove these solids from the loaded organic phase. A skimmer element may be utilized to remove solids from the loaded organic phase within the tank 36. Accordingly, screen or other mechanical devices may be utilized to control the nature of the loaded or organic material which is permitted to enter the surge tank 42.

While the material including the flocculent precipitate, and the like, which collect in the tank 55 may be suitably removed by merely withdrawing a portion of the slurry from the bottom discharge conduit 62, a screw type skimmer or the like 90 may be required in the bottom of the tank 36. This could be utilized to prevent accumulation of sludge in the bottom of the tank 36. The skimmer 90 includes openings along the periphery thereof for collecting the sludge for conveyance out of the treating tank 36. Of course, other types of sludge removers may be employed, as desired, the specific examples herein being for purposes of illustration only. Occasionally, it may be necessary to drain the individual treating tanks for maintenance, cleaning and the like. Thus, suitable discharge valves should be provided in the individual treating chambers.

While a sedimentation tank has been found to be previously required, it has been found that in accordance with the present invention, the use of a flocculation tank having a velocity gradient extending therethrough, will tend to retain the entrained oils, detergents and the like, which may be carried over from the extraction tank, in the lime sludge. Thus, these materials are simply removed from the bottom outlet 62 of the lime tank 65.

In order to increase agitation, paddle type mixers may be utilized to accomplish thorough agitation of the material before entering the lime treater.

In a typical application, an aqueous treating apparatus prepared in accordance with the present invention, shown in FIGURES 1 and 2 herein, and including a pair of treating tanks, each having a diameter of 34 inches, and a height of 72 inches, a laundry establishment utilizing alkyl benzene sulfonate as a detergent, and running at a normal capacity of about 10,000 gallons per day, the treatment was conducted as follows. A treating solution comprising kerosene and di-tallow amine, wherein the amine was present in a quantity representing 4% of the total composition, was combined with the waste discharge in a ratio of about 5% based upon the quantity of the waste discharge solution. The pH was lowered to about 3.8 by the addition of sulfuric acid to the mixture. From Table I, it can be seen that the concentration of the alkyl benzene sulfonate was reduced from 27.3 parts per million to 0.4 part per million, this representing a reduction of 99%. Calcium oxide was added to the partially treated solution at a rate of 1 pound per 100 gallons. The biological oxygen demand (B.O.D.) of the output was reduced sharply from that of the raw material, and accordingly, the dissolved oxygen content was increased substantially. The phosphate content of the solution was reduced by 91%. It can be seen, therefore, that the unit is effective in reducing the amount of detergent in a solution as well as the amount of phosphate present therein. Particular attention is directed to Table I which provides a group of data for this operation.

Table I

[Concentrations in p.p.m.]

| pH | | A.B.S.[1] | | B.O.D.[2] | | Susp. Solids | | Total Solids | | Turbidity | | Total Phosphates | | Dissolved Oxygen | |
|---|---|---|---|---|---|---|---|---|---|---|---|---|---|---|---|
| In | Out | In | Out | In | Out | In | Out | In | Out | In | Out | In | Out | In | Out |
| 8.5 | 6.1 | 27.3 | 0.4 | 130 | 40 | 100 | 48 | 647 | 1,360 | 137 | <100 | 118 | 11 | 0.1 | 2.2 |
| Percent Reduction | | 99 | | 69 | | 52 | | -------- | | [3] >27 | | 91 | | Increase | |

[1] Alkyl benzene sulfonate.
[2] Biochemical oxygen demand.
[3] Steady state conditions provides clear effluent.

It is understood that the above specific examples are provided for purposes of illustration only, and are not to be otherwise construed as a limitation upon the scope of the present invention. Those skilled in the art may deviate from the specific examples without departing from the spirit and scope of the present invention.

What is claimed is:

1. The method of treating detergent and phosphate-laden waste solutions which comprises adding a treating fluid containing a water immiscible detergent compatible amine compound to said waste solution, passing the mixture through a first treating chamber wherein a gaseous fluid is passed therethrough to remove a portion of the detergent organic and phosphate impurities therefrom, and to provide agitation, transferring said partially treated waste solution from said first treating chamber to a second treating chamber, adding a water soluble chemical having a cationic element which forms an insoluble phosphate to said partially treated solution to form a mixture including a phosphate precipitate in said waste solution, retaining said mixture in said second treating chamber to complete the precipitation reaction and form a sludge including said phosphate precipitate and a portion of said detergent and organic impurities, and then separating the sludge from said solution to form a clarified treated effluent.

2. The method as set forth in claim 1 being particularly characterized in that the pH of said waste solution in said first treating chamber is reduced to from between 3.0 and 5.0.

3. The method as set forth in claim 1 being particularly characterized in that said water soluble chemical is selected from the Group consisting of the water soluble salts of the elements of Group IIa of the Periodic Table.

4. The method as set forth in claim 3 being particularly characterized in that said water soluble chemical is calcium oxide.

5. The method of treating detergent and phosphate-laden aqueous waste solutions which comprises adding a treating fluid containing a predetermined quantity of a water immisicible detergent compatible amine compound to said waste solution, passing the mixture through a first treating chamber wherein a gaseous fluid is passed therethrough to remove a portion of the detergent impurities therefrom and form an immiscible phase, separating said immiscible phase from said waste solution and transferring said partially treated waste solution to a second treating chamber, adding a predetermined quantity of a water soluble salt the cationic element of which forms an insoluble phosphate to said partially treated waste solution to form a mixture including a phosphate precipitate and the remaining portion of said detergent impurities in said waste solution, retaining said mixture in said second treating chamber so as to complete the precipitation reaction and form a sludge, and then separating the sludge from said mixture to form a clarified treated effluent.

6. The method of continuously treating detergent and phosphate-laden aqueous waste solutions which comprises metering a treating fluid containing a water immiscible amine compound in a water immiscible solvent to said waste solution, exposing the mixture to a first treating chamber wherein a gaseous fluid is continuously passed therethrough to remove a portion of the detergent impurities therefrom and form a water immiscible phase therefrom, removing and separating said immiscible phase from said waste solution and conveying said partially treated waste solution to a second treating chamber, metering a water soluble salt the cationic element of which forms an insoluble phosphate to said partially treated waste solution to form a mixture including a phosphate precipitate and the remaining portion of said detergent impurities in said waste solution, retaining said mixture in a flocculation zone in said second treating chamber to complete the precipitation reaction and form a sludge, separating the sludge from said mixture to form a clarified treated effluent, and continuously removing sludge and effluent from said second treating chamber.

7. The method defined in claim 6, being particularly characterized in that said water immiscible amine compound is selected from the class consisting of di-oleyl amine and di-tallow amine.

8. The method defined in claim 6, being particularly characterized in that the pH of said waste solution in said first treating chamber is reduced to from between 3.0 and 5.0.

9. The method of treating detergent and phosphate-laden aqueous waste solutions as defined in claim 6, being particularly characterized in that said water soluble salt is selected from the Group consisting of the water soluble salts of the elements of Group IIa of the Periodic Table.

10. The method defined in claim 9, being particularly characterized in that said water soluble salt is calcium oxide.

11. In an apparatus for treatment of detergent and phosphate-laden waste solutions comprising means for introducing a first treating material into said waste solution, first and second waste solution treating chambers, and flow means for transferring waste solution from said first chamber to said second chamber, said first chamber having inlet means for receiving waste solution and said first treating material, vertically spaced upper and lower outlets, means for introducing a gaseous fluid into the solution within said first chamber at a point beneath said upper outlet to extract impurities from said solution, means for removing siad extracted impurities through said upper outlet, and means for removing waste solution from said lower outlet, said second treating chamber having an inlet, vertically spaced upper and lower outlets, and means for the addition of a second treating material to said waste solution, said flow means communicating with the lower outlet of said first chamber and the inlet to said second chamber for transferring solutions from the first chamber to the second chamber, said second chamber having a certain predetermined vertical axis and certain predetermined cross-sectional dimensions along said axis and adapted to retain a column of waste solution and said second treating material, the inlet to said second chamber having means to discharge solution thereinto to provide a flotation zone therein, the upper outlet of said second chamber being disposed vertically above said flotation zone.

12. The apparatus of claim 11 being further characterized in that metering means are provided for controlling the ratios of said first and said second treating materials relative to the waste solution.

13. In an apparatus for treatment of detergent and phosphate-laden waste solutions comprising means for introducing a first treating material into said waste solution, first and second waste solution treating chambers, and flow means for transferring waste solution from said first chamber to said second chamber, said first chamber having inlet means for receiving waste solution and said first treating material, vertically spaced upper and lower outlets, means for introducing a gaseous fluid into the solution within said first chamber at a point beneath said upper outlet to extract impurities from said solution, means for removing said extracted impurities through said upper outlet, and means for removing waste solution from said lower outlet, said second treating chamber having an inlet, vertically spaced upper and lower outlets, and means for the addition of a second treating material to said waste solution, said flow means communicating with the lower outlet of said first chamber and the inlet to said second chamber for transferring solutions from the first chamber to the second chamber, said second chamber having a periphery with a certain predetermined vertical axis and certain predetermined cross-sectional dimensions along said axis and adapted to retain a column of solution therein, said inlet being disposed coaxially with said axis and defining an annular zone with said periphery, and having means to discharge solution into said second chamber to provide a flotation zone in said annular zone, the upper outlet of said second chamber being disposed vertically above said flotation zone, the lower outlet being disposed within said flotation zone.

14. The apparatus as defined in claim 13 being particularly characterized in that said annular zone has a cross-sectional area which increases in an upward direction along said vertical axis.

References Cited by the Examiner
UNITED STATES PATENTS

| 3,123,553 | 3/1964 | Abrams | 210—30 |
| 3,200,069 | 8/1965 | Eisenhauer | 210—63 |

OTHER REFERENCES

Paulson, E. G.: Organics in Water Supply, Water and Sewage Works, June 1963, vol. 110, pp. 216–219.

MORRIS O. WOLK, *Primary Examiner.*

M. E. ROGERS, *Assistant Examiner.*